Aug. 25, 1953  E. B. CLARK  2,650,331
FLOOR OUTLET WITH SWITCH INTERLOCK
Filed May 1, 1951
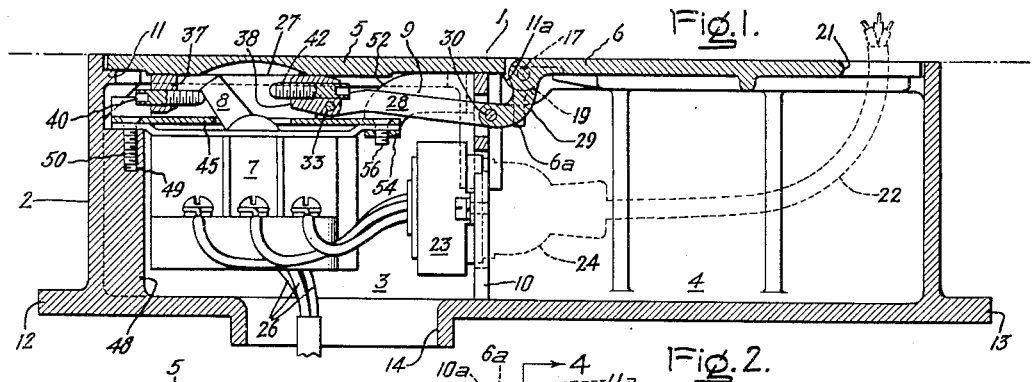
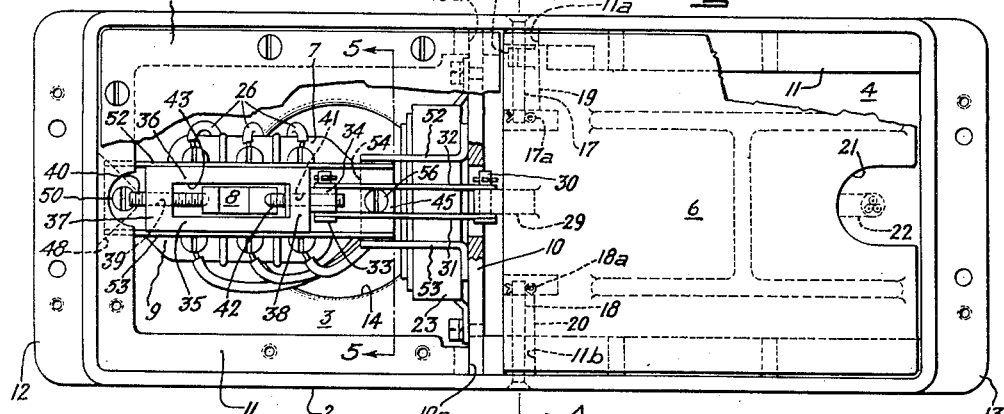
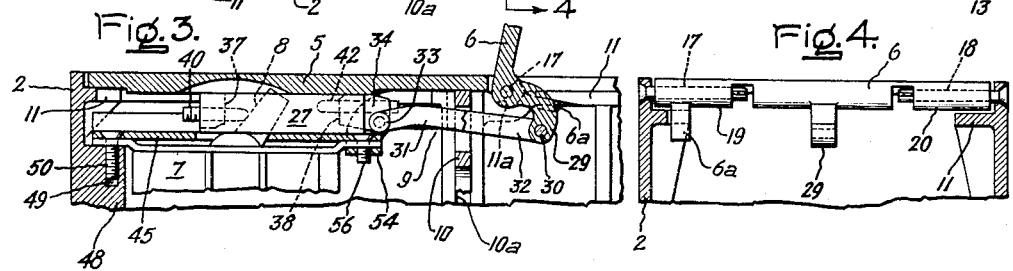
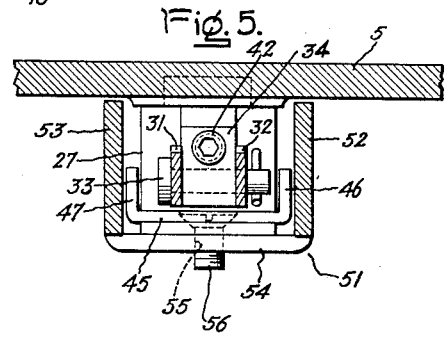
Inventor:
Edward B. Clark,
by *[signature]*
His Attorney.

Patented Aug. 25, 1953

2,650,331

UNITED STATES PATENT OFFICE 2,650,331

FLOOR OUTLET WITH SWITCH INTERLOCK

Edward B. Clark, Milford, Conn., assignor to General Electric Company, a corporation of New York Application May 1, 1951, Serial No. 223,957

3 Claims. (Cl. 317—120)

1

This invention deals with floor or convenience outlets and, in particular, to that type of floor outlet which has a movable cover that interlocks with a switch mechanism controlling the power supply to the floor outlet.

In the manufacture of electrical equipment, it is necessary frequently to connect the equipment to a convenience outlet for testing purposes. The testing may be conducted in an atmosphere that contains particles of dirt or dust of the type that are conductors of electricity or cause the atmosphere to be of an explosive nature. For example, the air can contain metal particles which settle near a convenience outlet whereupon a spark from the convenience outlet might start an arc that could injure the test man or the arc could set off an explosion.

Under certain circumstances, then, safety precautions demand a convenience outlet including a cover that prevents the insertion of a plug into the outlet while power is on.

It is an object of this invention to provide an improved safety outlet box.

It is a still further object of this invention to provide a convenience outlet wherein a plug cannot be connected to or disconnected from the outlet while power is being supplied to the outlet.

Further objects and advantages of this invention will occur to those skilled in the art and it is desired to be understood, therefore, that this invention is not intended to be limited to the particular embodiment disclosed, rather it is intended to cover all modifications which are within the true spirit and scope of this invention.

Broadly, this invention comprises both a new outlet box and the combination of a convenience outlet and a switch enclosed by the outlet box. The switch mechanism and box cover are so interlocked that power is not supplied to the convenience outlet so long as the cover is open.

Referring to the drawing, Fig. 1 is a side view partly in section of an improved floor outlet, Fig. 2 is a top view of the embodiment of the floor outlet shown in Fig. 1; Fig. 3 is a side view partly in section of the switch operating mechanism and a toggle switch in the circuit open position; Fig. 4 is an end view of the switch operating mechanism taken through the plane 4—4 of Fig. 2, while Fig. 5 is an end view of the switch operating mechanism taken along the line 5—5 of Fig. 2.

at-s,eorpt

Referring to the drawing, floor outlet box 1 is shown comprising a casing 2 divided into a switch compartment 3 and an outlet compartment 4, a fixed cover 5, a movable cover 6, a switch 7 including toggle arm 8, and a switch operating mechanism 9.

Casing or container 2 is in one embodiment a rectangular-shaped hollow box which is made of malleable iron. While its overall dimensions are not critical, the container should have a depth suitable to accommodate a common toggle switch such as that shown at 7. Container 2 is divided by a removable wall 10 into a switch or operating compartment 3 and an outlet or plug receiving compartment 4. Wall 10 is a slideable dividing plate. Container 2 is provided further with a lip 11 positioned slightly below its upper edge and extending substantially around its inner periphery to provide support for the cover portions 5 and 6.

To facilitate its mounting, container 2 is provided with a pair of flanges 12 and 13, each of which has mounting holes. An entrance hole 14 is positioned in the bottom of the container to admit power leads to the operating compartment 3.

Cover 5 encloses the switch compartment 3 and is secured to lip 11 by a conventional fastening means such as by screws; while movable cover 6 encloses the plug receiving compartment 4.

It is to be noted that cover 5 protrudes slightly beyond the division plate 10 thereby preventing the latter from being removed from its nesting slots 10a, positioned one on either side of case 2. Another function of the extending lip of cover 5 is to prevent dust from sliding down the plate 10 and accumulating on the face of the convenience outlet 23.

Movable cover 6 is supported by a pair of oppositely disposed taper headed pins or bearings 17 and 18 which pass one each through the wall 2 and bushings 19 and 20 respectively which are integral with the cover 6.

A particularly unique feature of this invention lies in the inter-relation between bushings 19, 20 and the lip 11 which extends around the inner periphery of case 2. That is, notches 11a, 11b are provided in lip 11 one on either side of case 2. The bushings 19, 20 fit through the notches into position for the insertion of pins 17, 18 therethrough. The pins are secured by cotter pins 17a, 18a. Furthermore, bushing 19 has a downwardly extending finger 6a which engages lip 11 as shown in Fig. 3 to limit the degree to which cover 6 may be opened.

A slot 21 is positioned in movable cover 6 to admit an electric cord therethrough. Consequently, an electric cord 22 such as that shown in dotted outline can be passed through the opening 21 to be in contact with the convenience outlet 23. Note, however, that a plug 24 connected to cord 22 cannot pass through the slot 21 in movable cover 6.

While it is not to be a limitation on the scope of this invention the switch 7, in the particular embodiment shown, is one of that family of toggle switches that spring to circuit open or closed position when its toggle arm 8 is moved past dead center. That is as soon as operating arm 8 passes through an axis perpendicular to the plane of the top face of the switch 7, then the arm 8 moves to either the circuit open or circuit closed position depending upon which side of the axis it may be. The purpose of switch 7 is to control the supply of power from incoming power leads 26 to the convenience outlet 23 and hence to the plug 24 and electric cord 22.

The switch operating mechanism 9 moves in response to the rotation of cover 6 to operate the toggle lever 8 of switch 7. Operating mechanism 9 comprises a carriage 27, a link 28, and a pivot arm 29 which is integral with the movable cover 6. Arm 29 preferably is at the longitudinal axis of the cover portion 6 and at one end thereof. For example, in the embodiment shown, it is adjacent the dividing plate 10. A pin 30 pivotally connects the arm 29 to the link 28, which, in turn, comprises a pair of parallel spaced apart arms 31 and 32, both of which are connected to the carriage 27 by means of a pivot pin 33. The pin 33 passes through a bore located in a boss 34 adjacent one end of the carriage 27. With the pivotal connections of pins 30 and 33, the rotational movement of the movable cover 6 and the arm 29 is translated into the longitudinal movement of link 28 and the carriage 27.

Carriage 27, in the embodiment shown, has a pair of longitudinal arms 35 and 36 connected at either end by one of the transverse arms 37 and 38. The transverse arms 37, 38 each contain a threaded portion 39, 41, respectively, each of which accommodates a round pointed set screw 40, 42, respectively. The set screws 40 and 42 are adjustable to limit the travel of the switch arm 8.

The carriage defines a hollow opening 43 which accommodates the toggle lever 8 of switch 7. Consequently, as carriage 27 is longitudinally moved in response to the rotation of cover 6, the toggle arm 8 is moved with the carriage 27 to the circuit open or circuit closed position. That position of the toggle arm and carriage shown in Fig. 1 is the circuit closed position of switch 7, while that position of the toggle arm and the carriage shown in Fig. 3 is the circuit open position of switch 7.

Carriage 27 is supported for longitudinal movement between the under surface of the fixed cover 5 and a carriage plate 45. The carriage plate 45, as shown particularly in Fig. 5, has a pair of sides 46 and 47 which limit the transverse movement of the carriage 27. Consequently, carriage 27 is restrained for longitudinal or switch operating movement.

The support of carriage plate 45 is effected as follows. Container or case 2 is provided with a boss 48 which includes a threaded bore 49 to engage a screw 50 and hence one end of each of the switch 7 and carriage plate 45. The other end of switch 7 and carriage plate 45, however, are supported by a saddle 51 which comprises a pair of arms 52 and 53 attached at one end to wall 10 and a strap 54. Strap 54 includes a threaded bore 55 and engages a screw 56 thereby locking the other end of carriage plate 45 and switch 7 for a rigid support of the switch and the carriage plate.

It can be seen from Fig. 1 that the switch does not close, that is, the toggle arm 8 does not reach the over center position, until the rotating cover 6 is practically in its closed position, whereupon the lever arm 8 trips to the circuit closed position. This structure provides for the safety feature of preventing the insertion of a hand or of the plug 24 when the switch is in the circuit closed position.

On the other hand, it is to be noted that set screw 40 is in contact with toggle arm 8 in the closed position of cover 6. Consequently, as soon as cover 6 is rotated about its pivot 17 and 18, the carriage 27 immediately starts to move the lever arm 8 and by the time the cover is open just slightly, the toggle arm 8 is beyond the over center position and hence trips switch 7 to the circuit open position.

In operation, then, this new and improved floor outlet provides a safety feature heretofore unknown in the art. The combined elements are so constructed and arranged that they permit the engagement of a plug with a convenience outlet while cover 6 is open, but under these circumstances, there is no power to the plug. It is only when the cover has been closed that the switch is moved to the circuit closed position and power is placed on the plug.

Modifications of this invention will occur to those skilled in the art and it is desired to be understood, therefore, that this invention is not to be limited to the particular embodiment disclosed, but that the appended claims are meant to cover all the modifications which are within the spirit and scope of this invention.

What I claim as new and desire to secure by Letters Patent of the United States is:

1. In combination, an outlet box having an open top, a transversely extending partition wall in the box which divides it into a switch compartment and an outlet compartment, a removable cover fixed over the switch compartment, a hinged cover for the outlet compartment, the hinge means for the hinged cover being located adjacent said transversely extending partition wall, a switch in the switch compartment having an operating arm, a convenience outlet mounted in the box with its contact receiving openings facing into the outlet compartment, said convenience outlet being wired to said switch, a slidably mounted carriage in the switch compartment for actuating the switch operating arm, a crank arm connected to the underside of said hinged cover projecting down into the outlet compartment, and a link which extends through said partition wall and is pivotally connected at one end to said carriage and at the other end to said crank arm whereby opening and closing movement of said cover actuates said switch by sliding the carriage relatively to the switch.

2. In combination, an outlet box having an open top, a transversely extending partition wall in the box which divides it into a switch compartment and an outlet compartment, a removable cover fixed over the switch compartment, a hinged cover for the outlet compartment, the hinge means for the hinged cover being located adjacent said transversely extending partition wall, a switch in the switch compartment having an operating arm, a convenience outlet mounted in said switch compartment on said partition wall with its contact receiving openings facing into the outlet compartment, said convenience outlet being wired to said switch, a carriage mounted in the switch compartment to slide across the top of said switch, said carriage having an opening in which said switch arm is positioned to be actuated by sliding movement of said carriage, a crank arm connected to the underside of said hinged cover projecting down into the outlet compartment, and a link which extends through said partition wall and is pivotally connected at one end of said carriage and at the other to said crank arm whereby opening and closing movement of said cover actuates said switch by sliding the carriage relatively to the switch.

3. In combination, an outlet box having an open top, a transversely extending partition wall in the box which divides it into a switch compartment and an outlet compartment, a removable cover fixed over the switch compartment, a hinged cover for the outlet compartment, the hinge means for the hinged cover being located adjacent said transversely extending partition wall, a switch mounted in the switch compartment with its top surface facing and adjacent the underside of said removable cover, and with its switch arm projecting toward the removable cover, a carriage slidably mounted between the top surface of the switch and the underside of said removable cover which engages the switch arm to actuate the switch, a convenience outlet mounted in the box with its contact receiving openings facing into the outlet compartment, said convenience outlet being wired to said switch, a crank arm connected to the underside of said hinged cover projecting down into the outlet compartment, and a link which extends through said partition wall and is pivotally connected at one end to said carriage and at the other end to said crank arm whereby opening and closing movement of said cover actuates said switch by sliding the carriage relatively to the switch.

EDWARD B. CLARK.

References Cited in the file of this patent

UNITED STATES PATENTS

| Number | Name | Date |
|---|---|---|
| 1,652,531 | Jennings | Dec. 13, 1927 |
| 1,725,441 | Caldwell | Aug. 20, 1929 |
| 2,441,643 | Mickler | May 18, 1948 |
| 2,492,739 | Galaher | Dec. 27, 1949 |

FOREIGN PATENTS

| Number | Country | Date |
|---|---|---|
| 25,265 | Australia | Feb. 20, 1930 |
| 107,275 | Great Britain | June 28, 1917 |